US007128642B1

United States Patent
Veldkamp et al.

(10) Patent No.: US 7,128,642 B1
(45) Date of Patent: Oct. 31, 2006

(54) METHOD AND APPARATUS FOR REMOVING FAT AND SKIN FROM MEAT PARTS

(75) Inventors: Brent M Veldkamp, Cumming, IA (US); Jarrod A Grim, Ankeny, IA (US); Robert T Seaberg, Jr., Des Moines, IA (US); Colin R Hart, Ankeny, IA (US); Paul J Joynt, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 72 days.

(21) Appl. No.: 11/098,100

(22) Filed: Apr. 4, 2005

(51) Int. Cl.
*A22C 17/00* (2006.01)
(52) U.S. Cl. ..................................................... 452/129
(58) Field of Classification Search ............... 452/125, 452/129, 127, 134, 136, 82–84, 94, 95, 97; 99/585, 588, 593, 594
See application file for complete search history.

(56) References Cited

U.S. PATENT DOCUMENTS

| | | | |
|---|---|---|---|
| 3,613,154 A | | 10/1971 | Townsend |
| 4,606,093 A | * | 8/1986 | Townsend .................... 452/127 |
| 4,920,875 A | * | 5/1990 | Schill ........................... 99/589 |
| 5,429,548 A | * | 7/1995 | Long et al. .................. 452/127 |
| 5,902,177 A | * | 5/1999 | Tessier et al. ............... 452/156 |
| 6,086,470 A | * | 7/2000 | Ranniger ..................... 452/127 |
| 6,129,625 A | * | 10/2000 | Cate et al. ................... 452/127 |
| 6,213,863 B1 | * | 4/2001 | Basile et al. ................. 452/127 |
| 6,277,019 B1 | | 8/2001 | Veldkamp et al. |
| 6,558,242 B1 | | 5/2003 | Veldkamp et al. |
| 6,659,856 B1 | * | 12/2003 | Long ........................... 452/127 |
| 6,824,460 B1 | * | 11/2004 | Young et al. ................. 452/83 |

* cited by examiner

*Primary Examiner*—Thomas Price

(57) ABSTRACT

An apparatus and method for removing skin and fat from meat parts, a tooth roll assembly attached to a frame and a trimming blade assembly attached to an adjustable frame where the position of the trimming blade assembly is adjusted in relation to the tooth roll assembly based upon the thickness of a layer of fat of the meat part.

11 Claims, 4 Drawing Sheets

METHOD AND APPARATUS FOR REMOVING FAT AND SKIN FROM MEAT PARTS

BACKGROUND OF THE INVENTION

This invention is directed toward a trimming device for removing skin and fat from meat parts, and more particularly toward a trimming device that is adjustable based on the fat depth of the meat part.

In the meat processing industry it is necessary and desirable to remove the skin and fat from a meat part, such as a pork leg, before separating the muscles for processing. To date, this has been done manually, using knives. Not only does this method require substantial labor, but it is also time consuming and creates safety hazards creating the potential for lacerations and cumulative trauma injuries. The manual process also has the potential for yield loss because the trimmer has difficulty identifying the lean muscle under the fat layer prior to cutting into the fat layer.

Alternatively, automated systems have been used to remove the skin, but the fat layer is still removed manually, presenting the same problems in the art. With some skinning machines, defatting attachments have been added to remove the layer of fat. These defatting attachments are adjustable to remove different thicknesses of fat layer, but the machine operator must estimate the thickness visually, and then manually adjust the attachment. This process is time consuming and inaccurate such that either additional manual trimming is required, or some lean muscle is lost. Accordingly, a need exists in the art for an improved method and apparatus for removing skin and fat from a meat part.

Therefore, a primary objective of this invention is to provide a method and apparatus for removing skin and fat from a meat part that reduces lost yields and labor costs.

Another objective of this invention is to provide a method and apparatus that is more precise in trimming skin and fat from a meat part.

These and other objectives will be apparent to those skilled in the art based on the following disclosure.

SUMMARY OF THE INVENTION

The present invention involves a method and apparatus involving a machine having a tooth roll assembly and a trimming blade assembly. The tooth roll assembly has a dead plate, a tooth roll, a skinning blade, a nip roll, a shoe, and a measuring device. The tooth roll assembly receives a layer of skin between the tooth roll and the shoe for removal thereof from a meat part, and the tooth roll assembly receives a layer of fat between the shoe and the nip roll. A measuring device connected to the nip roll and a controller monitors the thickness of the fat layer between the shoe and the nip roll.

The trimming blade assembly has a trimming blade and a fluted roll. The fluted roll assists in rotating and supporting the meat part while the position of the trimming blade is adjusted by the controller based upon the monitored thickness of the fat layer.

DETAILED DESCRIPTION OF THE INVENTION

Figure 1:
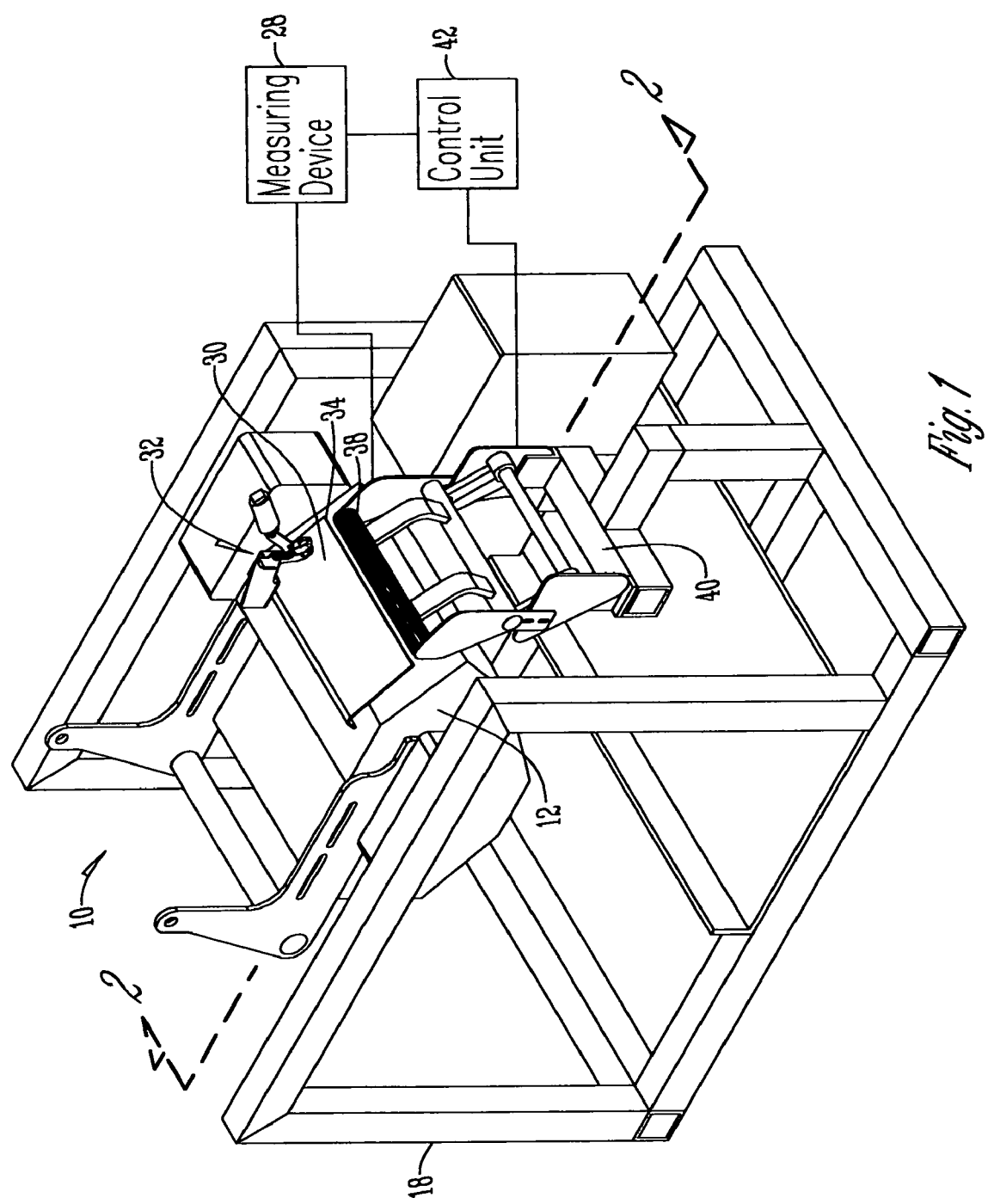
FIG. 1 is a perspective view of the device of this invention.
Figure 2:
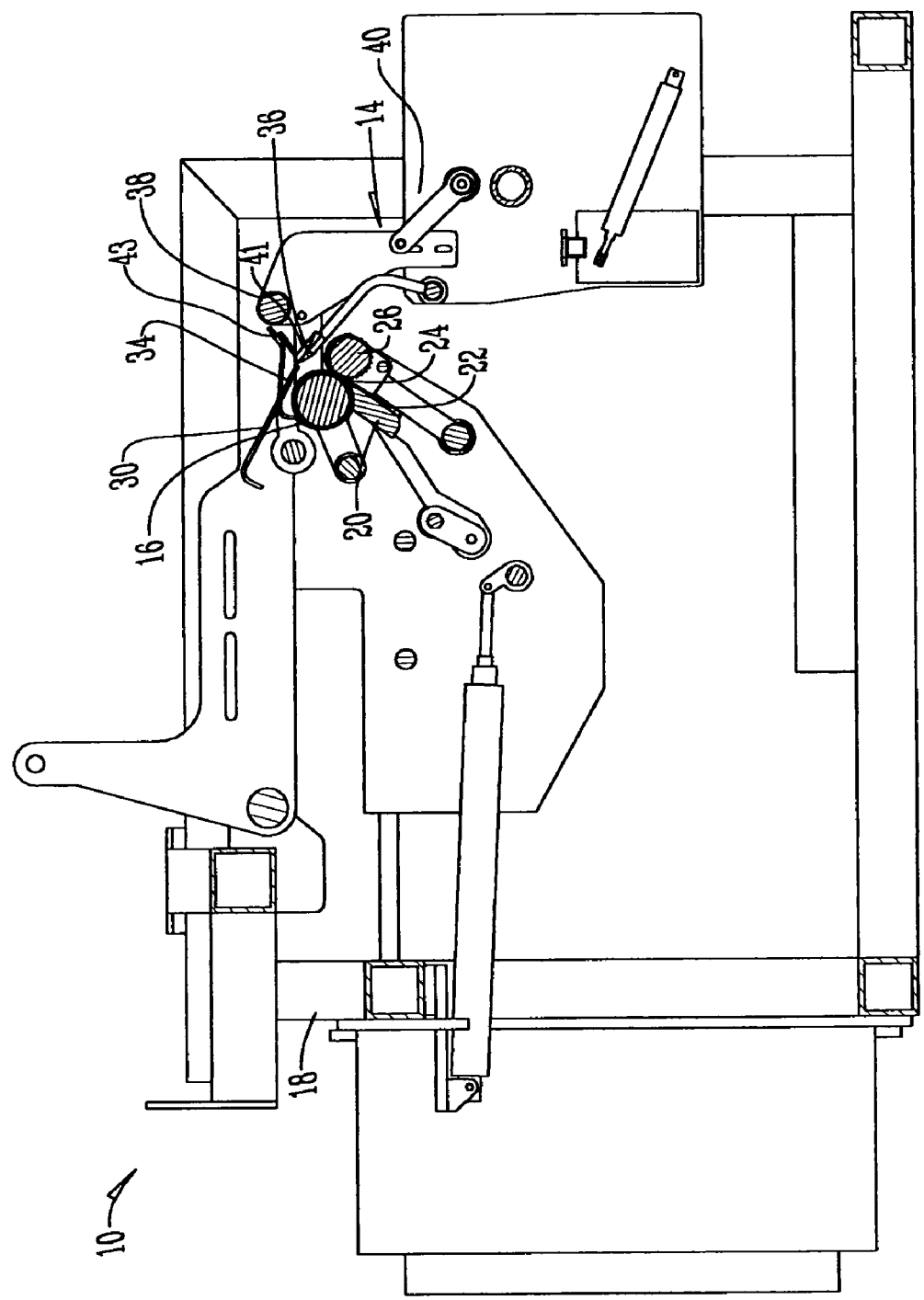
FIG. 2 is a side elevation cross-section view of the device of this invention taken along line 2—2 of FIG. 1.
Figure 3:
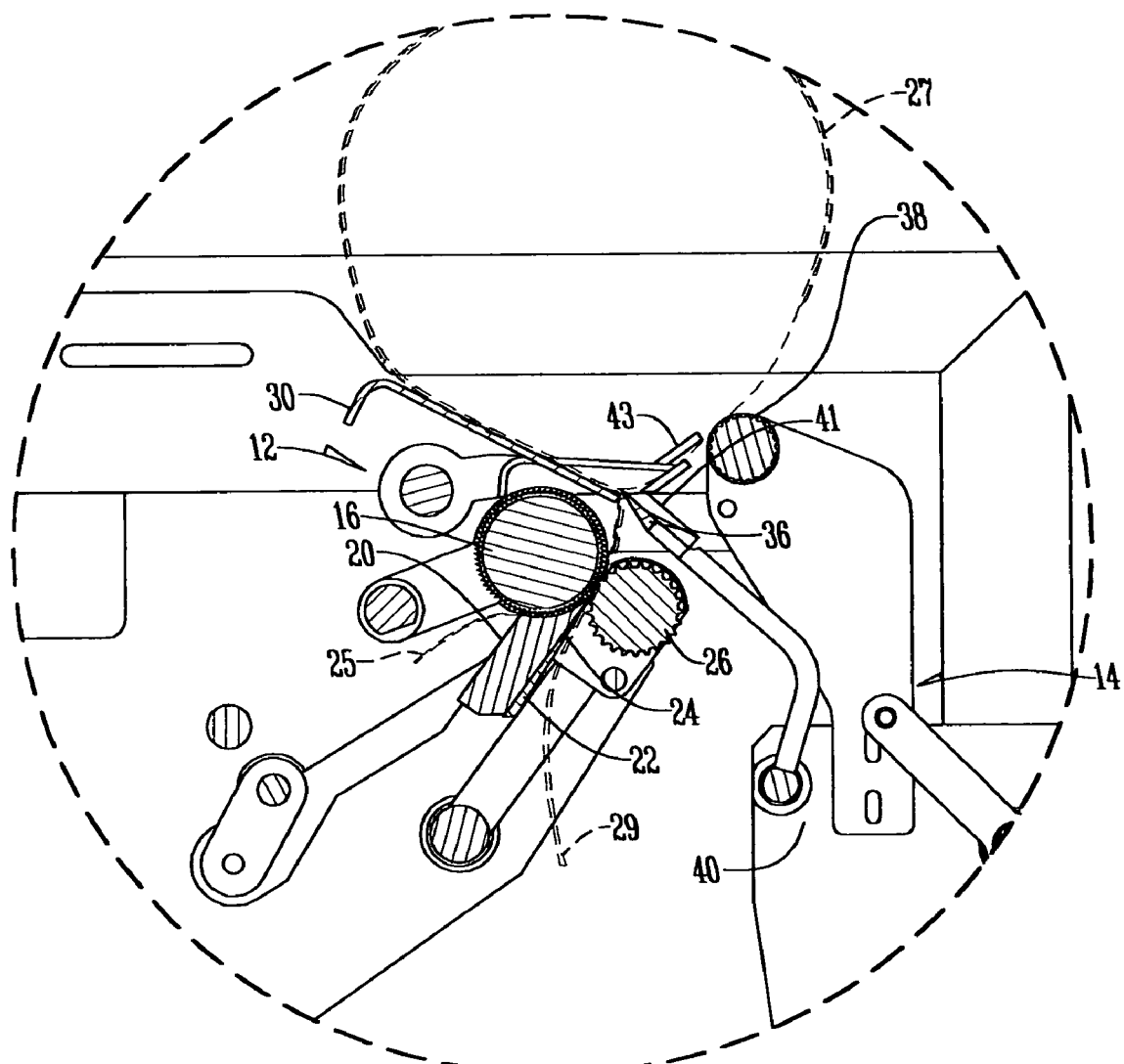
FIG. 3 is an enlarged side elevation view of the device of this invention as shown in FIG. 2 during the trimming of a pork leg.

Referring to the figures, the machine 10 of this invention has a tooth roll assembly 12 and a trimming blade assembly 14. The tooth roll assembly 12 is rotatably mounted to a frame 18 and includes a tooth roll 16 that is rotatably mounted to and extends from the tooth roll assembly 12. The tooth roll 16 is driven in any conventional manner such as by a pulley assembly (not shown) operatively connected to a power source (not shown). Positioned generally below the tooth roll 16 is a shoe 20 with a blade clamp 22 attached thereto for receiving and holding a skinning blade 24. The skinning blade 24 is positioned between the shoe 20 and the clamp 22 such that blade 24 is adjacent the radial surface of the tooth roll 16.

Positioned partially below the tooth roll 16 and partially above the shoe 20 and skinning blade 24 is a nip roll 26 that is rotatably mounted to the tooth roll assembly 12 and driven in a manner similar to the tooth roll 16. The nip roll 26 rotates in a direction opposite that of the tooth roll 16 at a speed relative to the tooth roll 16, and the nip roll 26 is mounted in close proximity to the shoe 20 and skinning blade 24 such that the nip roll 26 assists in directing the layer of skin 25 of the meat part 27 between the shoe 20 and the tooth roll 16. The tooth roll 16, shoe 20, and skinning blade 24 remove the skin 25 from the meat part 27 and provide a pulling force to pull the layer of fat 29 toward the trimming blade frame 40. While the path of the removed skin 25 runs between the shoe 20 and the tooth roll 16, the removed fat layer 29 runs in a path between the shoe 20 and the nip roll 26.

The nip roll 26 is mounted to the frame such that the nip roll 26 is forcibly moved away from the shoe 20 as the thickness of the fat layer increases. Connected to the nip roll 26 is a measuring device 28 such as an encoder that monitors the displacement of the nip roll 26 during operation of the machine 10. In one embodiment the measuring device 28 separately monitors the displacement of the nip roll 26 at each end.

Positioned above the tooth roll 16 is a dead plate 30 which supports the meat part 27. The dead plate 30 has an edge 34 that is parallel and adjacent to the outer surface at the tooth roll 16 such that a flap of skin 25 and a fat layer 29, previously cut from the meat part 27, are received between the tooth roll 16 and the nip roll 26. In an alternative embodiment a holding device 32 is mounted to the dead plate 30 to hold the meat part 27. The dead plate 30, holding device 32, and meat part 27 are lowered so that the flap of skin 25 and layer of fat 29 from the meat part 27 are received between the toothroll 16 and the nip roll 26. During operation the holding device 32 rotates in conjunction with the rotation of the meat part. When trimming is completed, the holding device 32, dead plate 30, and meat part 27 are raised together away from the tooth roll 16 and nip roll 26.

Figure 4:
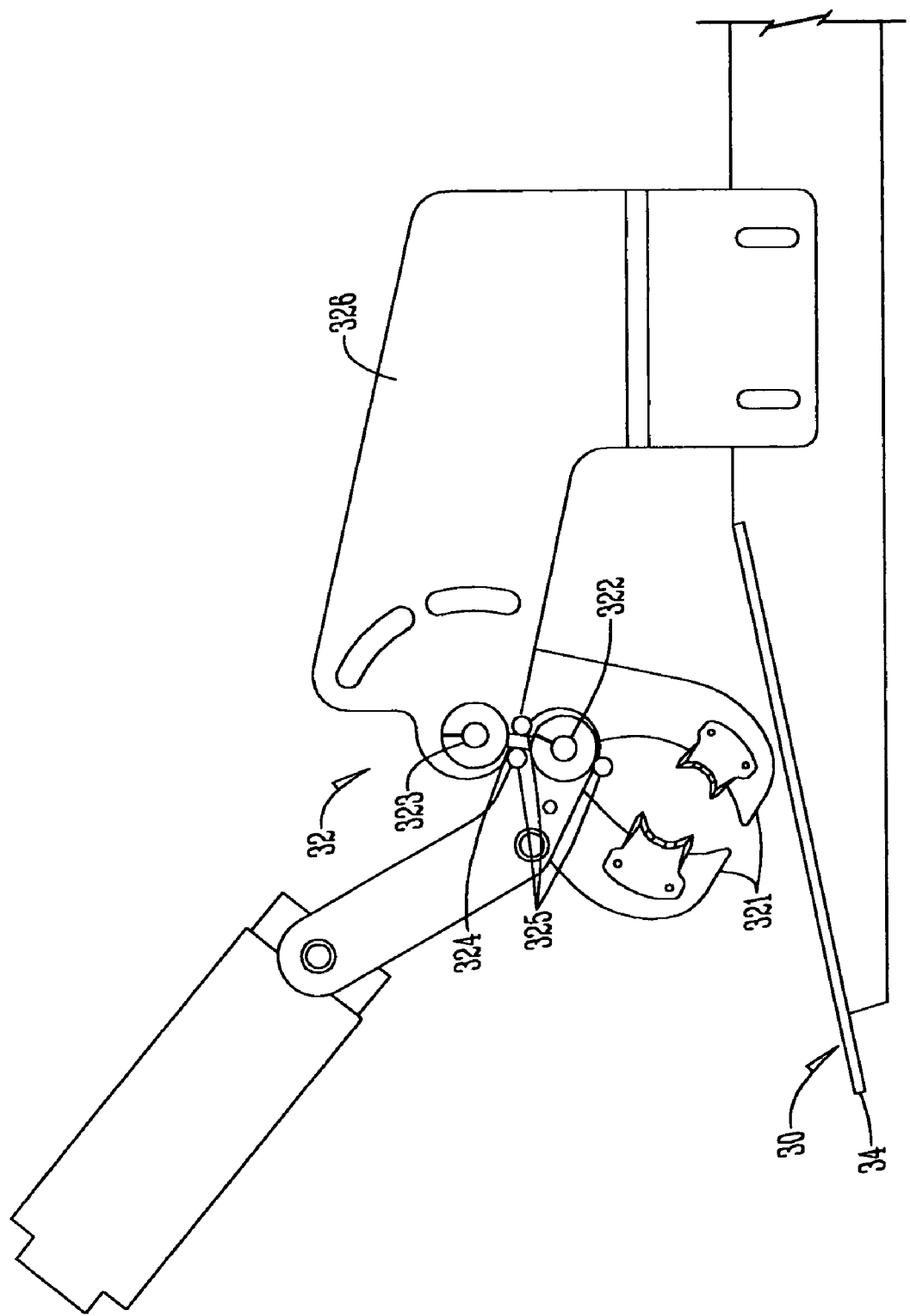
FIG. 4 is a side view of a holding device.

The holding device 32 as shown in FIG. 4 consists of a shank clamp 321, two pivot axes 322, 323, and a link 324 between the pivot axes that are connected to a mounting plate 326. The holding device 32 clamps securely onto the shank bones of the pork leg and guides its rotation. The first pivot axis 322 is near the axis of the shank, and connects the shank clamp 321 and the link 324. The second axis 323 is near the axis of the loin end of the pork leg and connects the link 324 to the mounting plate 326 that is fastened to the dead plate 30. Stops 325 are mounted on the axes to limit the rotation about the axes. When trimming begins, the pork leg and holding device 32 are free to rotate about the axis 322 that is near the shank axis. This rotation is appropriate for trimming around the knuckle muscle, which has a smaller radius of curvature. As trimming continues, a stop 325 limits the rotation about the shank axis 322, and forces the pork leg, holding device 32, and link 324 to rotate about the second axis 323 that is near the pork leg axis. This rotation is appropriate for trimming around the remainder of the pork leg, which has a larger radius of curvature.

Sensors mounted adjacent to the holding device signal the controller when the rotation of the pork leg and holding device 32 has reached predetermined set points. One of the sensors signals the controller to change the movement of the blade 36 and the algorithm by which the trimming depth is determined. The other sensor signals the controller to end trimming.

The trimming blade assembly 14 includes a trimming blade 36 and a fluted roll 38, mounted to a trimming blade frame 40. The trimming blade 36 is held to the trimming blade frame 40 by a blade cover 41. The trimming blade assembly 14 moves relative to frame 18 toward and away from a position adjacent to and parallel to the toothroll 16, and also toward and away from a position adjacent to and parallel the edge 34 of the dead plate 30 so that the distance between the trimming blade 36 and the edge 34 may be varied. The trimming blade 36 is mounted at an angle relative to the meat part 27 surface and preferably oscillates in a plane parallel to the surface of the meat part 27. The tip of the blade cover 41 is close in proximity to the tip of the trimming blade 36. The side of the blade cover 41 extending away from the tip of the trimming blade 36 is at an angle such that the blade cover 41 holds the lean muscle of the meat part 27 away from the tip of the trimming blade 36. The angle of the trimming blade 36 and the blade cover 41 allows the trimming blade 36 to scrape the surface of the lean muscle on the meat part without cutting into the muscle. To create the oscillating motion of the trimming blade 36 the trimming blade frame 40 reciprocates relative to the trimming blade assembly 14 in a direction perpendicular to the edge 34 of the dead plate 30 to scrape the fat membrane. Simultaneously, the trimming blade frame 40 reciprocates relative to the trimming blade assembly 14 in a direction parallel to the edge 34 of the dead plate 30 to cut the fibers between the fat and the membrane. In other embodiments, the trimming blade 36 does not oscillate, but rather reciprocates in a direction perpendicular to or parallel to the edge 34 of the dead plate 30, or remains stationary. Alternatively, different combinations of movement are incorporated during different operations of the device.

The fluted roll 38 is mounted above the trimming blade 36 in parallel spaced relation. In conjunction with the dead plate 30, the fluted roll 38 supports the meat part 27 and through rotation helps to turn the meat part 27 during operation. Alternatively, the fluted roll 38 is fixed and supports the meat part 27.

In operation, during loading, the tooth roll assembly 12 is pivoted relative to the frame 18 and the trimming blade assembly 14 such that the shoe 20, the skinning blade 24 and the nip roll 26 are raised to allow the skin 25 and fat layer 29 from the meat part 27 to fall between the tooth roll 16 and nip roll 26. The trimming blade assembly 14 is positioned away from the tooth roll assembly 12 during loading. The meat part 27 is positioned on the dead plate 30 and a flap of skin 25 and fat layer 29 is cut in the meat part 27, such as near the point on a pork leg where the leg is separated from the carcass. The meat part 27 is positioned such that the flap extends below the edge 34 of the dead plate 30, above the skinning blade 24. The tooth roll 16 rotates to draw the skin 25 and the fat layer 29 between the shoe 20 and the nip roll 26. The tooth roll assembly 12 then rotates to lower the shoe 20 and nip roll 26 away from the dead plate 30. Once the tooth roll assembly 12 is lowered, the trimming blade assembly 14 is moved toward the tooth roll assembly 12 and into trimming position.

In the trimming position, the meat part 27, such as a pork leg, is supported by the dead plate 30 and the fluted roll 38 and the meat part 27 rotates about a central axis of the leg parallel to the shank. The rotation of the tooth roll 16 and nip roll 26, along with the rotation of the fluted roll 38, cause the pork leg to rotate about its axis. As the tooth roll 16 and nip roll 26 rotate, the flap is drawn toward the skinning blade such that a skin layer 25 is drawn between the tooth roll 16 and the shoe 20. Similarly, the flap is drawn toward the trimming blade 36 such that the blade 36 cuts the fat from the muscle and a fat layer 29 is drawn between the shoe 20 and the nip roll 26.

A bridge 43 is rotatably mounted on the dead plate 30 and rests on an attachment to the trimming blade assembly 14 when the machine is in the trimming position. The bridge 43 supports the shank end of the pork leg during trimming. An additional blade may be mounted on the bridge to cut the skin between the loin end being trimmed and the shank end.

As the fat layer 29 is drawn between the shoe 20 and the nip roll 26, the thickness of the fat layer 29 forces the nip roll 26 away from the shoe 20. The displacement of the nip roll is monitored by the measuring device 28 which sends a signal to a control unit 42. The control unit 42 adjusts the position of the trimming blade assembly 14 in relation to the tooth roll assembly 12 based on the monitored displacement of the nip roll 26. More specifically, the distance between the trimming blade 36 and the edge 34 of the dead plate 30 is adjusted so that the blade 36 separates the fat from the muscle without cutting into the muscle. In one embodiment the movement of the trimming blade 36 is changed at the transition point between soft fat and hard fat. Soft fat is the portion of fat that is more easily separated from the muscle and is best separated with an oscillating movement from the blade 36. Hard fat is more difficult to separate from muscle and is best separated with either a reciprocating motion of the blade 36 parallel to the edge 34 of the dead plate 30 or no motion at all.

While the control unit 42 continuously adjusts the position of the trimming blade assembly, in one embodiment the control unit 42 sets a blade 36 position based on the monitored displacement when the transition point on the meat part reaches the nip roll 26. Alternatively, an operator sets a blade 36 position from a plurality of selected fat depth profiles. For example, to save labor costs in removing residual fat a customer may select a fat profile that is deeper and cuts slightly into the muscle. Alternatively, to reduce lost yields a customer may select a fat profile that is less deep and leaves some residual fat.

Accordingly, from this disclosure a device for skinning and trimming fat from a meat part that is adjustable to reduce labor and lost yields has been described and at least all of the stated objectives have been met.

We claim:

1. A device for removing fat and skin from a meat part, comprising:
   a tooth roll assembly having a tooth roll, a shoe, a skinning blade, and a clamp, the tooth roll assembly mounted to a frame;
   a trimming blade assembly having a trimming blade, the trimming blade assembly positioned in spaced relation to the tooth roll assembly wherein the spacing between the tooth roll assembly and the trimming blade assembly is adjustable based upon a thickness of a layer of fat from the meat part; and
   wherein the tooth roll assembly has a nip roll wherein the layer of fat is drawn between the shoe and the nip roll to force the nip roll away from the shoe.

2. The device of claim 1 wherein the tooth roll assembly is further comprised of a dead plate.

3. The device of claim 2 wherein a layer of skin from the meat part is drawn between the tooth roll and the shoe.

4. The device of claim 2 further comprising a holding device mounted to the dead plate.

5. The device of claim 1 wherein the displacement of the nip roll in relation to the shoe is monitored by a measuring device.

6. The device of claim 5 wherein the trimming blade assembly is positioned in relation to the tooth roll assembly based upon the monitored displacement of the nip roll.

7. The device of claim 1 wherein the trimming blade assembly is comprised of a trimming blade and a fluted roll mounted to an adjustable frame.

8. The device of claim 7 wherein the trimming blade moves in an oscillating manner.

9. The device of claim 7 wherein the trimming blade reciprocates in a direction parallel to the tooth roll assembly.

10. The device of claim 7 wherein the trimming blade reciprocates in a direction perpendicular to the tooth roll assembly.

11. The device of claim 1 further comprising a bridge mounted to the tooth roll assembly.

* * * * *